UNITED STATES PATENT OFFICE.

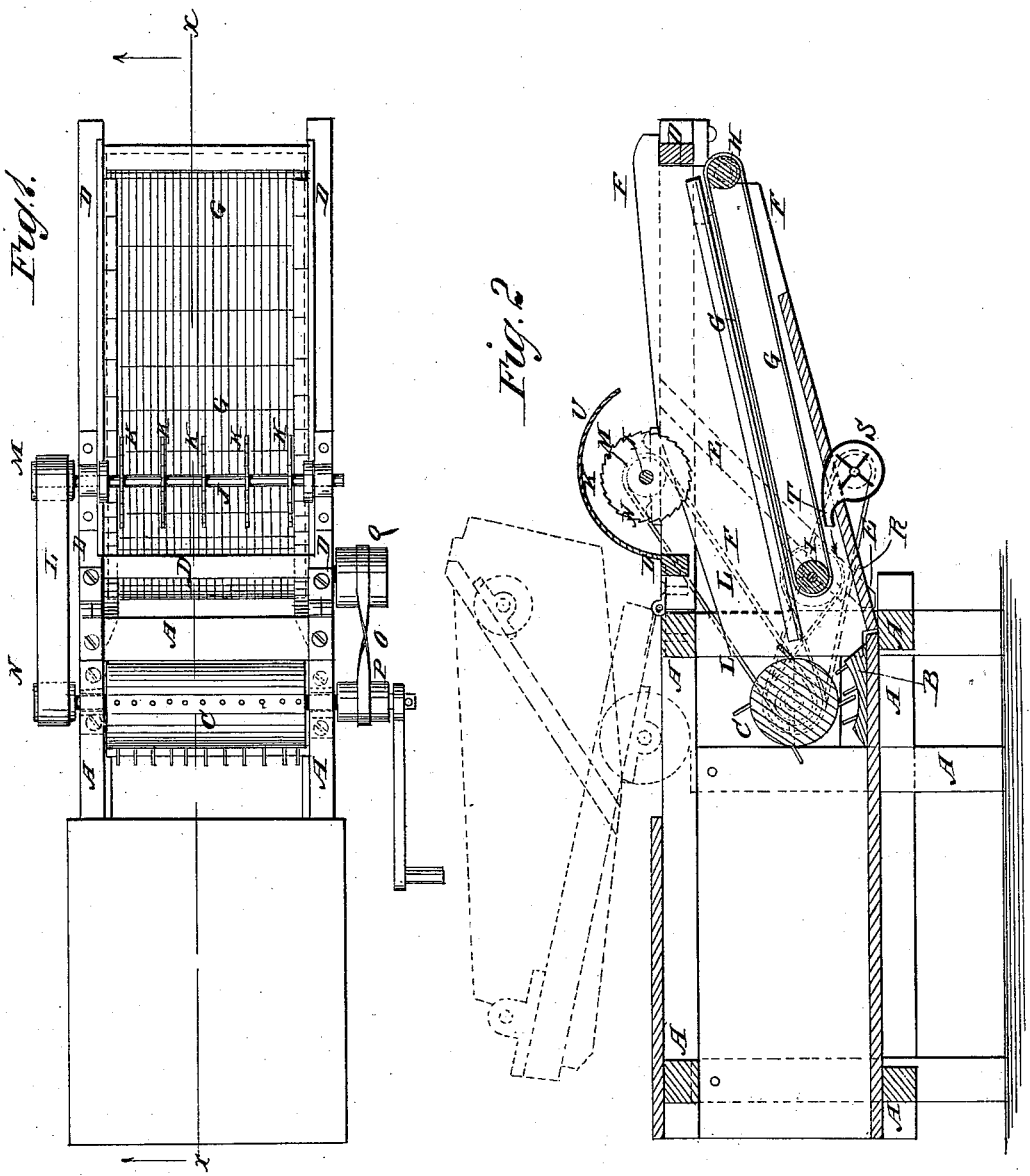

SAMUEL CALDWELL AND JORDAN BURGESS, OF GREENFIELD, ASSIGNORS OF ONE-THIRD TO LUTHER BRADLEY, OF ROSS COUNTY, OHIO.

BAND-CUTTING AND FEEDING ATTACHMENT FOR THRASHERS.

SPECIFICATION forming part of Letters Patent No. 253,815, dated February 14, 1882.

Application filed June 3, 1881. (Model.)

*To all whom it may concern:*

Be it known that we, SAMUEL CALDWELL and JORDAN BURGESS, of Greenfield, in the county of Highland and State of Ohio, have invented a new and useful Improvement in Band-Cutting and Feeding Attachments for Thrashers, of which the following is a specification.

Figure 1 is a plan view of our improvement. Fig. 2 is a sectional side elevation of the same, taken through the line $x\ x$, Fig. 1.

Similar letters of reference indicate corresponding parts.

A represents the frame of a thrashing-machine. B is the concave, and C is the cylinder.

To the front top bar of the frame A is hinged the inner end of a frame, D, which is supported in a horizontal position by the inclined bars E, attached to the said frame D in such a position that their lower ends will rest in the angle between the front posts and the lower side bars of the frame A. The sides of the frame D have casing-boards F attached to them, to prevent the grain from escaping laterally.

G is an endless feed-apron, which passes around a roller, H, journaled to the outer end of the frame D, and around a roller, I, journaled to the lower parts of the inclined bars or braces E, so that the feed-apron will have an inclined position to carry the grain to the thrashing-cylinder C.

Beneath the inner part of the endless feed-apron G is placed a bottom, R, of sheet-iron or other suitable material, to catch the scattered grain. Beneath the feed-apron G is placed a fan-blower, S, the discharge-spout T of which is made of the same width as the feed-apron G, and is so placed as to direct the air-blast beneath the said feed-apron and in the direction of the thrashing-cylinder C, so as to blow the scattered grain toward the said thrashing-cylinder, and thus prevent grain from being carried back by the endless apron and thus clogging the machine. The fan-blower S can be driven from the thrasher-cylinder by a crossed belt, or from the cutter-shaft by a straight belt, as may be convenient.

To the frame D, at a little distance from its inner end, is journaled a shaft, J, to which at suitable distances apart are secured circular cutters K. The cutters K can be made with smooth or serrated edges, as may be desired. The shaft J and cutters K are rotated by a belt, L, which passes around a pulley, M, attached to the said cutter-shaft, and around a pulley, N, attached to a journal of the thrashing-cylinder C, or to the shaft that runs the vibrator, and which is not shown in the drawings. The cutters K are covered by a curved plate, V, of sheet-iron or other suitable material, to prevent the attendants from being accidentally injured by the said cutters. The endless feed-apron G is driven from the thrashing-cylinder C by a crossed belt, O, which passes around a pulley, P, attached to the journal of the said cylinder C, and around a pulley, Q, attached to a journal of the lower roller, I. With this construction, by throwing off the belts L O the frame D and its attachments can be turned up upon the top of the thrasher A for convenience in moving the machine, and to obtain access to the thrashing-cylinder C.

In using the machine the bundles are laid upon the outer part of the endless apron G, and as they are carried inward by the said apron they pass beneath and have their bands cut by the rotating cutters K.

Having thus fully described our invention, we claim as new and desire to secure by Letters Patent—

The combination, with the hinged frame D E F and feed-apron G, of the fan-blower S, having its discharge-spout made of the same width with the feed-apron, substantially as shown and described, and for the purpose set forth.

SAMUEL CALDWELL.
JORDAN BURGESS.

Witnesses:
R. T. McALPIN,
R. P. BARRETT.